(12) United States Patent
Wu et al.

(10) Patent No.: US 7,366,981 B2
(45) Date of Patent: Apr. 29, 2008

(54) IMAGE FORMING DEVICE AND METHOD

(75) Inventors: Qingsu Wu, Ebina (JP); Masayoshi Sakakibara, Ebina (JP); Masatoshi Tagawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 335 days.

(21) Appl. No.: 10/373,782

(22) Filed: Feb. 27, 2003

(65) Prior Publication Data
US 2004/0068698 A1 Apr. 8, 2004

(30) Foreign Application Priority Data
Oct. 4, 2002 (JP) .............................. 2002-292964

(51) Int. Cl.
*G06F 15/00* (2006.01)
*G06F 17/00* (2006.01)
(52) U.S. Cl. .................... 715/525; 715/517; 715/523
(58) Field of Classification Search ................ 715/525, 715/517, 523
See application file for complete search history.

(56) References Cited

U.S. PATENT DOCUMENTS

| | | | | | |
|---|---|---|---|---|---|
| 5,754,832 | A | * | 5/1998 | Sasaki | 715/525 |
| 6,239,803 | B1 | * | 5/2001 | Driskell | 715/810 |
| 6,388,765 | B1 | * | 5/2002 | Nagano et al. | 358/1.18 |
| 6,798,905 | B1 | * | 9/2004 | Sugiura et al. | 382/168 |
| 6,801,230 | B2 | * | 10/2004 | Driskell | 715/854 |
| 6,857,102 | B1 | * | 2/2005 | Bickmore et al. | 715/501.1 |
| 2002/0033959 | A1 | * | 3/2002 | Ando et al. | 358/1.13 |
| 2002/0069228 | A1 | * | 6/2002 | Mori et al. | 707/524 |
| 2003/0079183 | A1 | * | 4/2003 | Tada et al. | 715/515 |
| 2003/0112278 | A1 | * | 6/2003 | Driskell | 345/788 |

FOREIGN PATENT DOCUMENTS

JP A 10-74265 3/1998

OTHER PUBLICATIONS

Blattner, Patrick; Special Edition Using Microsoft Excel 2002; May 18, 2001; Que; Chapter 5 sections Printing a Worksheet, Previewing the Print Job, Using Page Break Preview, Working the Page Setup Options.*
LeadTools, Lead Technologies Announces LeadTools; May 25, 2001; Lead Technologies, Inc.*
Wright, Don et al., XHTML-Print, Draft 0.951, Mar. 7, 2002, pp. 1-24.*

* cited by examiner

*Primary Examiner*—Doug Hutton
*Assistant Examiner*—N Hillery
(74) *Attorney, Agent, or Firm*—Oliff & Berridge, PLC

(57) ABSTRACT

An image forming device for dividing a continuous document without the concept of pages, such as an HTML document, into pages, the device being capable of responding to a user's various needs in connection with page dividing. A page dividing processor (304) is provided with a plurality of page dividing algorithms which differ in terms of treatment of a document element placed across a page boundary. When a user inputs a page dividing policy using a user interface (301), a dividing algorithm designating section (305) specifies a page dividing algorithm corresponding to the policy, and notifies the page dividing processor (304) of the algorithm. The page dividing processor (304) divides an HTML document into pages according to the algorithm.

18 Claims, 6 Drawing Sheets

DIVIDE IN UNITS OF CELLS

| OBJECT TYPE | DIVIDING METHOD |
|---|---|
| TABLE | DIVIDABLE IN UNITS OF CELLS |
| LIST | DIVIDABLE IN UNITS OF ITEMS |
| IMAGE | DIVIDING REFRAINED IF POSSIBLE |

DIVIDE IN UNITS OF
TABLES

DIVIDE IN UNITS OF
CELLS

DIVIDE IN UNITS OF
LINES IN CELL

IMAGE FORMING DEVICE AND METHOD

BACKGROUND OF THE INVENTION

1. Field of the Invention

The present invention relates to a page dividing technique for use in printing a continuous document which is continuously written, without the concept of pages like an HTML document, using a device, such as a page printer, for outputting in units of pages.

2. Description of the Related Art

When a continuously written document without the concept of the concept of pages, such as an HTML document, is printed using a page printer for outputting in units of pages, generally, a printer driver or a print server in a host computer divides the printing document into pages to thereby create print data to be supplied to a printer for printing. Conventionally, this page dividing is performed according to a page dividing method built into a program being used.

A print controller disclosed in, for example, Japanese Patent Laid-open Publication No. Hei 10-74265 performs page dividing according to a fixed dividing method which relies on a page dividing policy such that original positional images should be maintained and that dividing of a rendering object should be prevented.

However, such a fixed page dividing method offered by a program does not always satisfy everyone's needs. For example, some users may wish to use the smallest possible number of sheets for printing in order to save costs, while others may wish to print in good appearance with the least possible dividing of an image. A conventional printer or printer driver does not fully satisfy a user's potential demand.

SUMMARY OF THE INVENTION

The present invention has been conceived in view of the above, and advantageously offers an image forming device and method which can satisfy a user's various demands in connection with a page dividing method.

In order to provide the above advantage, according to the present invention, there is provided an image forming device for dividing a continuously written document into pages for image formation, comprising: page dividing means provided with a plurality of page dividing algorithms, for performing page dividing by dividing a continuously written document into a plurality of pages; algorithm designation means for receiving, from a user, designation of one page dividing algorithm to use among the plurality of page dividing algorithms; and control means for controlling the page dividing means to perform page dividing according to the page dividing algorithm of the user designation received by the algorithm designation means.

In the above image forming device, the algorithm designation means includes correlation information storing means for storing information concerning correlation between a page dividing policy and a page dividing algorithm, user interface means for presenting as options a plurality of page dividing policies to a user to receive a user selection of one page dividing policy to use, and algorithm determination means for obtaining a page dividing algorithm corresponding to the page dividing policy of the user selection received through the interface means, with respect to the information stored in the correlation information storing means to determine the obtained page dividing algorithm as an algorithm designated by the user.

DESCRIPTION OF THE PREFERRED EMBODIMENTS

In the following, an embodiment of the present invention (hereinafter referred to as an embodiment) will be described with reference to the accompanied drawings.

Figure 1:
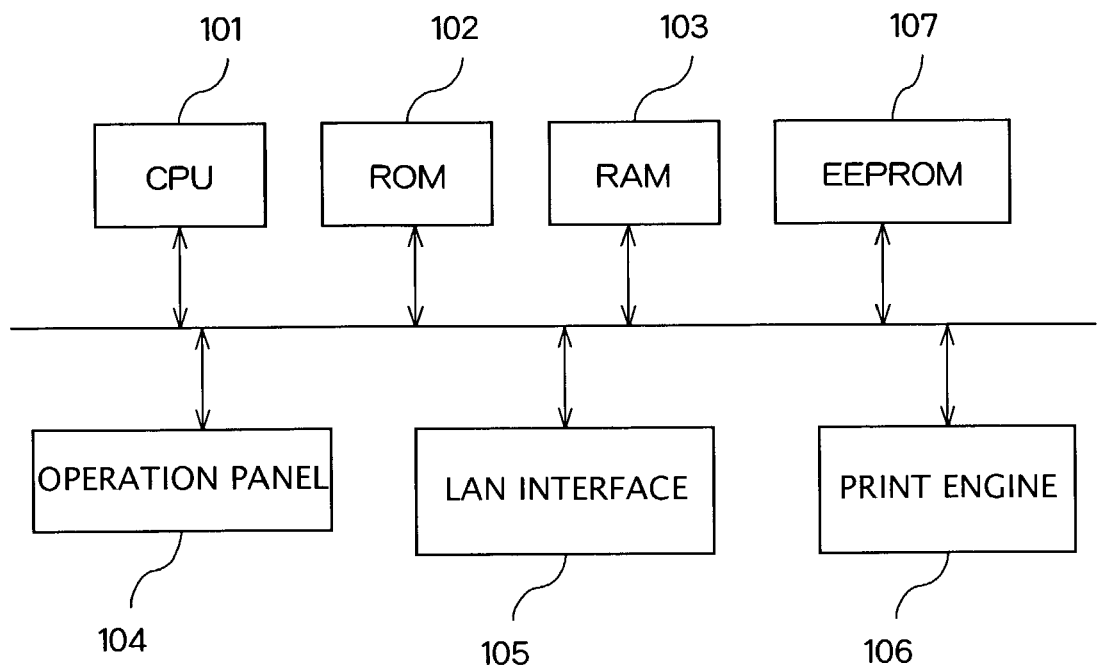
FIG. 1 is a block diagram showing an example hardware structure of a printer incorporating the present invention.

FIG. 1 schematically shows an example of a hardware structure of a printer in this embodiment.

This printer comprises a central processing unit, or CPU, 101, a read-only-memory, or ROM, 102, a random-access-memory, or RAM, 103, an operation panel 104, a local area network, or LAN, interface 105, a print engine 106, and an EEPROM 107.

The CPU 101 executes various kinds of control programs stored in the ROM 102 to thereby control respective sections of the printer of the present invention so that the printer can perform various operations. The control programs include a program which describes a control operation for dividing a document, such as HTML, XHTML-print, or the like, into pages for page printing. The page dividing will be described later in detail.

The RAM 103 serves as a working memory region, or a work memory, where the CPU 101 executes various kinds of programs, and may store printer received data (such as image data and HTML data) and developed or expanded data thereof, or bit map data. The operation panel 104 serves as a user interface via which to set a print condition in the printer and may comprise a touch panel liquid crystal display or various other input buttons.

The LAN interface 105 is responsible for communication with other devices over the LAN or those on the Internet via the LAN. The print engine 106 receives printing bit map data in response to a command from the CPU 101 and prints it on a medium such as a sheet. An Electrically Erasable Programmable Read-Only Memory, or EEPROM, 107 is a non-volatile rewritable storage device and stores various kinds of programs and setting data specified by a user or a service engineer.

Figure 2:
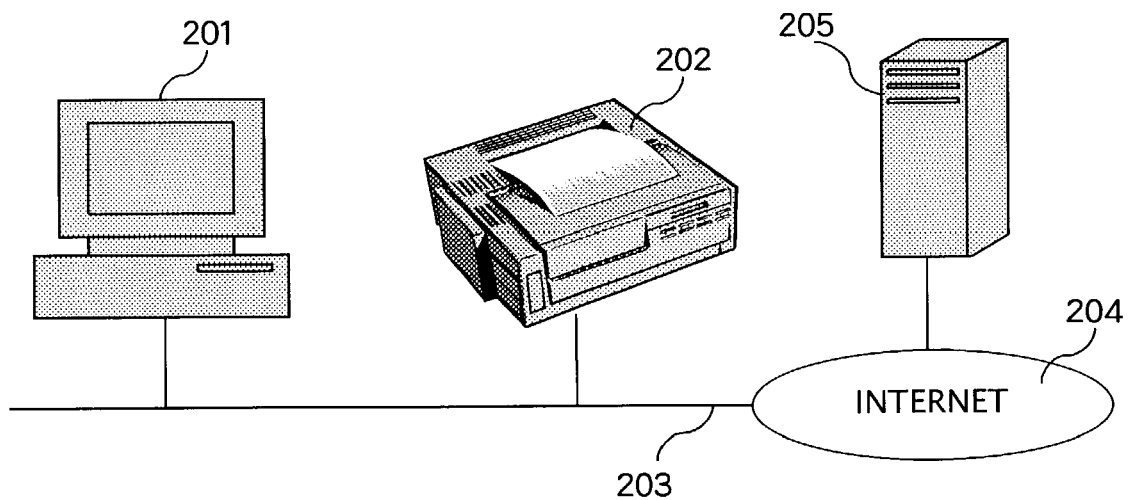
FIG. 2 is a diagram showing an example network environment to which the present invention is applied.

FIG. 2 shows an example structure of a system which employs the printer 202. In this example, a client PC (personal computer) 201 and a printer 202 are connected over the LAN 203. The client PC 201 and the printer 202 are both connected via the LAN 203 to the Internet 204, to which a server 205 is also connected.

In the system shown in FIG. 2, the client PC 201, for example, sends printing HTML document data and a request for printing the HTML document to the printer 202. Having received the request and the HTML data, the printer 202 analyzes the HTML document data and creates bit map data for printing on a medium.

In the case where the HTML document accompanies an object (a document element) by including a uniform resource locator, or URL, or the like, which represents the object, the printer 202 downloads the object data in question from a server 205 in possession of the object over the Internet 204 according to the URL or the like, to complete the creation of bit map data. Besides, the URL of a targeted HTML document may be directly input using the operation panel 104 of the printer 202 or sent from the client PC 201 or a mobile device, not shown, to the printer 202 to thereby instruct the printer 202 to print (pull-print). In these cases, the printer 202 downloads the concerned HTML document from the Internet 204 according to the input URL to complete printing.

A printer in this embodiment is provided with a plurality of page dividing algorithms for page dividing for printing of document data, such as an HTML document, which is written continuously in a description language without the concept of pages (a continuously written document), and encourages a user to select his desired printing algorithm among the plurality of printing algorithms provided.

It should be noted that a page dividing algorithm is a specific procedure to determine a manner of allocation of a rendering object extending across a page boundary (i.e., a rendering object extending beyond a page end) when it is placed according to a description in an HTML document, to the two successive pages before and after the page boundary. Each of the page dividing algorithms may be mounted as a different program. Alternatively, a parameter value for one program may be changed so that the program can be executed as a different page dividing algorithm.

Here, because having a user directly designating a page dividing algorithm may often result in complexity, a more general page dividing policy can be designated in this embodiment. A page dividing policy refers to preference in page dividing, an example of which may include "sheet saving preferred" and "good appearance preferred".

Figure 3:
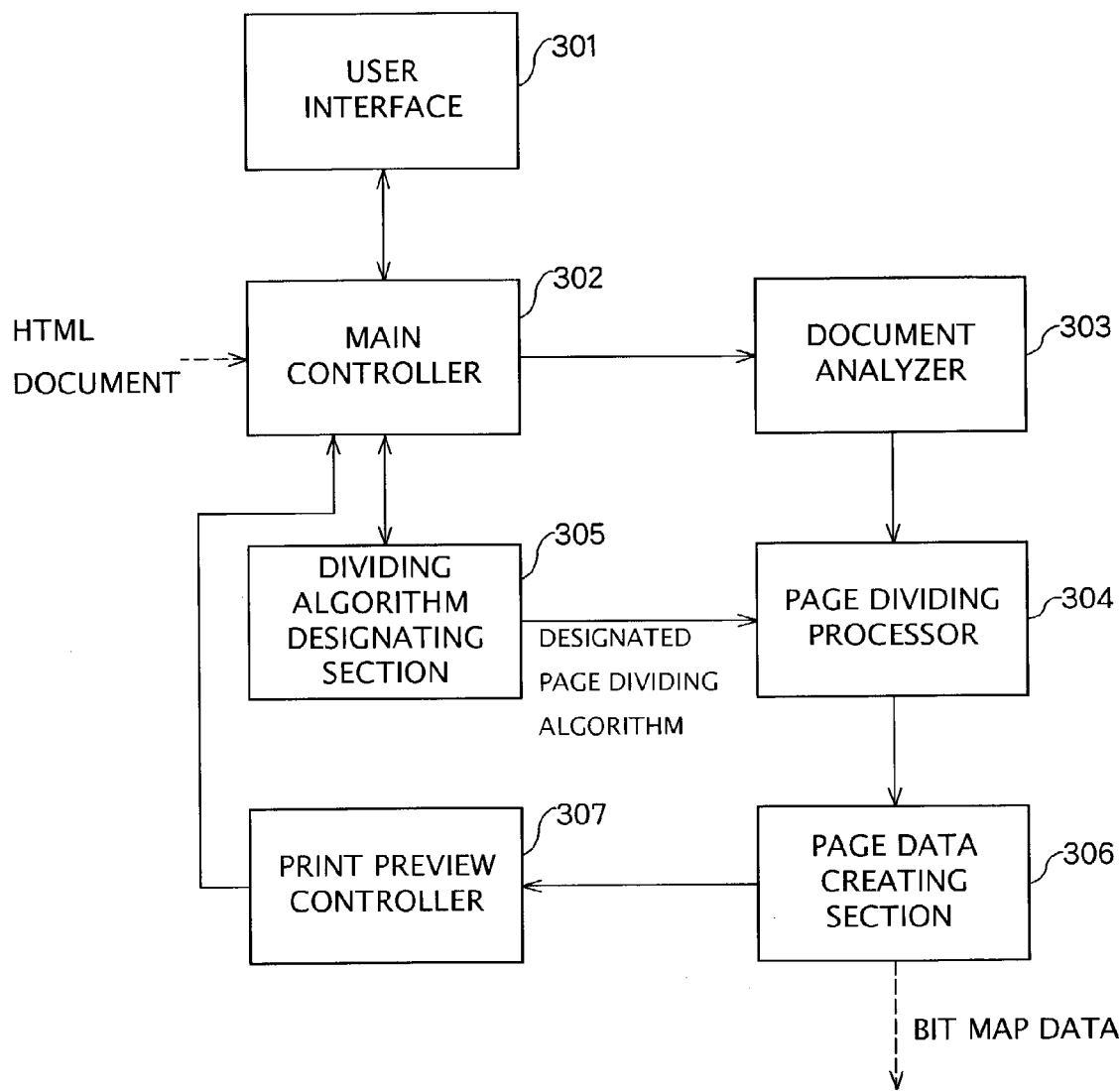
FIG. 3 is a functional block diagram showing a mechanism for printing an HTML document in this embodiment.

FIG. 3 is a functional block diagram showing a mechanism for printing an HTML document in a printer in this embodiment. The mechanism of FIG. 3 is achieved by the CPU 101 by executing a program or setting data stored in the ROM 102 or the EEPROM 107.

A user interface 301 is means for receiving a user designation via an operation panel 104. A main controller 302 is responsible for controlling the entire printing process. A document analyzer 303 analyzes an input HTML document to find an object (a document element) incorporated therein and creates content data for each object. Objects include one type which is incorporated in an HTML document and another type which is to be downloaded from an outside server according to a designation on a reference to an outside source. For the latter, the document analyzer 303 downloads content data from an outside source which is identified by a URL and so forth.

A page dividing processor 304 divides a continuous HTML document into pages based on various information including a page size which is set via the user interface 301 and a size of each object which is determined in analysis. In this embodiment, the page dividing processor 304 is provided with a plurality of page dividing algorithms, and a dividing algorithm designating section 305 receives a user designation of one of the page dividing algorithms to use.

Specifically, for specification of a page dividing algorithm designated by a user, the dividing algorithm designating section 305 creates an algorithm selection user interface screen image, displays the screen image on the operation panel 104 via the user interface 301, and receives a user selection made using the screen image, for one of the dividing algorithms. More specifically, some page dividing policies are listed in the user interface screen image and, when a user selects a desired dividing policy from among those shown in the image, the dividing algorithm designating section 305 specifies a page dividing algorithm corresponding to the selected dividing policy.

Using the thus specified user designated page dividing algorithm, the page dividing processor 304 performs page dividing with respect to an HTML document. Based on the result of page dividing, the page data creating section 306 creates bit map data representing an image of each page. Further, based on the created bit map data, a print preview controller 307 creates a preview image to display on a display of the operation panel 104. Whether or not to display a preview image can be designated via the user interface 301.

In pull-printing, for example, a user designates various conditions, using the user interface 301, such as a URL of a printing document, a print condition (a page size, one-sided or double-sided printing, and so forth), a page dividing algorithm, and whether or not to display a preview image. According to these conditions, the main controller 302 downloads the designated printing document or one or more objects referred to in the designated document for use in subsequent analysis, page dividing, page data creation, and so forth, by the above-described respective sections.

When display of a preview image is not instructed, the created page data is forwarded directly to a print engine 106 for printing. When display of a preview image is instructed, on the other hand, a preview image is displayed based on the created page data. After affirming the displayed preview image, the user instructs to begin printing using the user interface 301. Thereupon, the main controller 302 forwards the created page data to the print engine 106 for printing. Should the displayed preview image be different from the user's intending image, the user can change the print condition and page dividing algorithm.

In the above, it is possible to arrange such that a document, such as an HTML document, sent from a client PC 201 to the printer 202 for printing may be temporarily held in the printer 202, so that a user coming over to the printer 202 can designate, using the operation panel 104, a print condition, a page dividing algorithm, whether or not to display a preview image, and so forth.

Alternatively, a program for receiving designation on a print condition and a page dividing algorithm may be installed in the client PC 201, so that the program receives and sends the designation to the printer 202 together with a printing HTML document. Still alternatively, the printer 202 may offer a web (www) page for print instruction to the client PC 201 so that the client PC 201 can designate, using the web page, a URL of a printing document, a print condition, a page dividing algorithm, whether or not to display a preview image, and so forth. In this case, a preview image can be provided to the client PC 201, using a web page.

Figure 4:
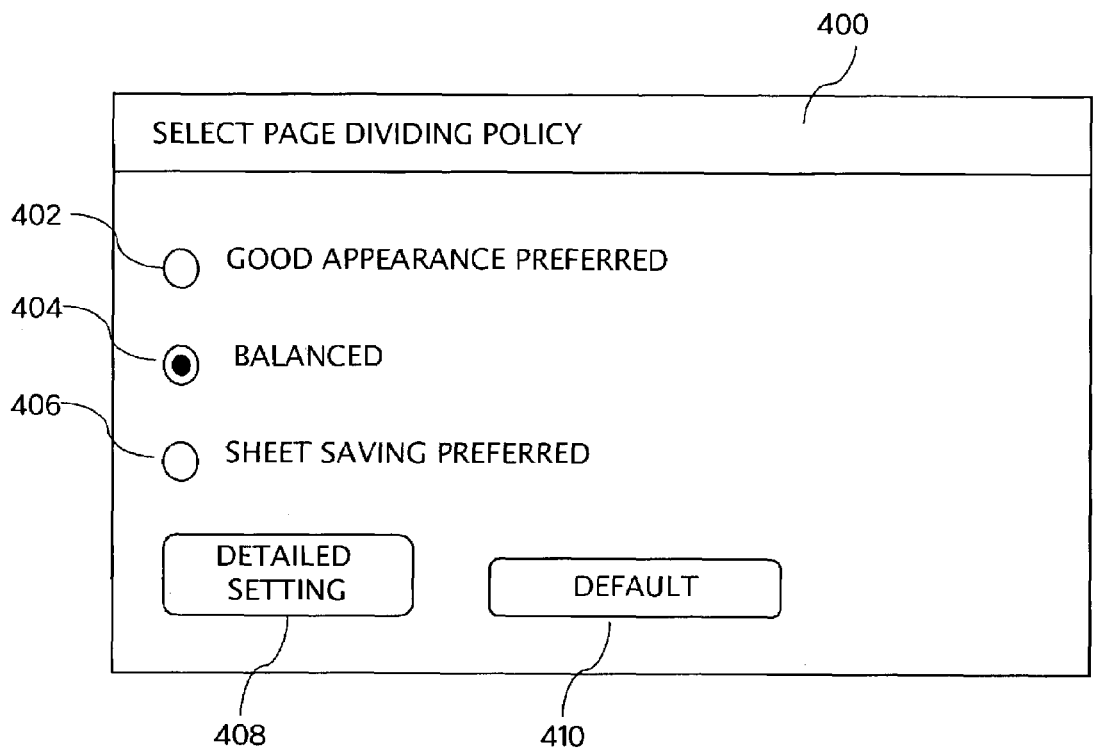
FIG. 4 is a diagram showing an example user interface screen image for designation in connection with page dividing in this embodiment.

FIG. 4 shows an example of a user interface screen image, specifically, a general setting screen image 400, provided by the user interface 301, for use in designation in connection with page dividing. In the general setting screen image 400, three general page dividing policies, namely "good appearance preferred", "sheet saving preferred", and "balanced", are listed as options.

"Good appearance preferred" is a policy such that dividing of an image or a table by a page boundary should be avoided as much as possible, and is therefore likely to increase the number of pages to use. "Sheet saving preferred" is a policy such that the number of sheets to use should be reduced even at the expense of good appearance. "Balanced" is a policy intermediate between "good appearance preferred" and "sheet saving preferred", and attains good appearance and sheet saving to some balanced extent by, for example, avoiding division of a small object image such as a letter and a small image and allowing division of a large object image such as a large image or table.

Each page dividing policy is presented in a manner that is easily understandable to a user by using, for example, a keyword, an icon, or a drawing. One of these policies is selectable using a radio button 402, 404, or 406 provided to the left of the respective policies.

The general setting screen image 400 additionally includes a detailed setting button 408 and a default button 410. The detailed setting button 408 is used to retrieve a detailed setting screen image 500 for designation of detailed policies on page dividing, as shown in FIG. 5, and the default button 410 is used to select a predetermined default page dividing algorithm.

Figure 5:
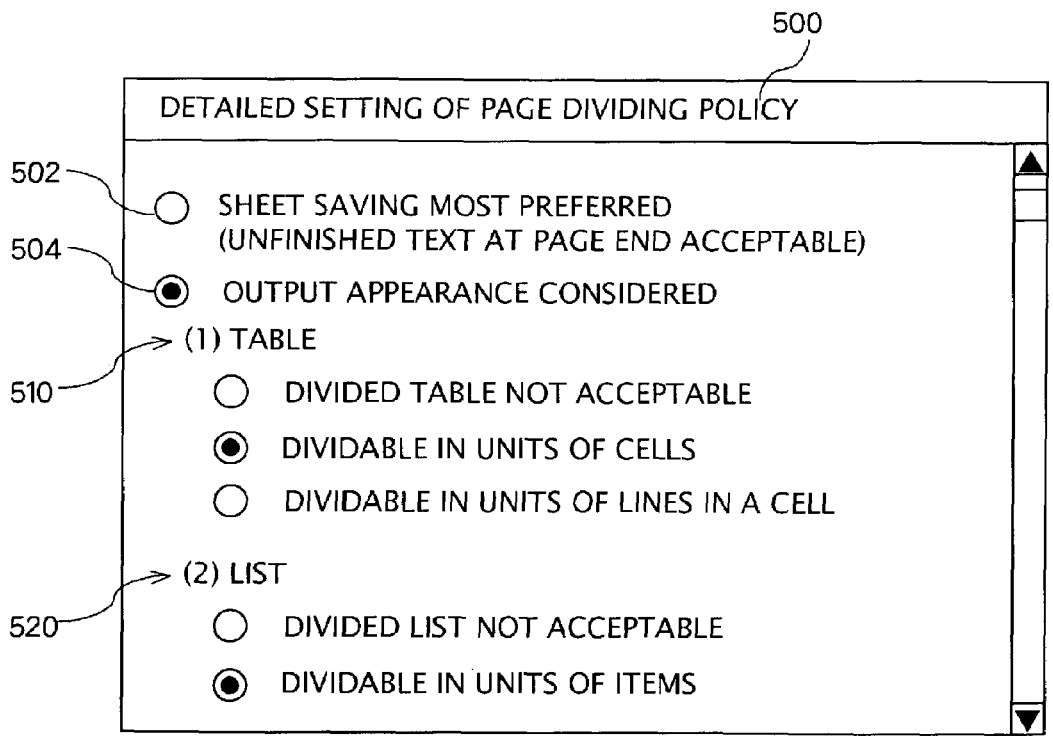
FIG. 5 is a diagram showing an example user interface screen image for designation in connection with page dividing in this embodiment.

The detailed setting screen image 500 of FIG. 5 allows designation of details for a page dividing policy. In this example, two major policies, namely "sheet saving most preferred" and "output appearance considered", are listed, so that a user can select one of these policies, using a radio button 502 or 504.

When "sheet saving preferred" is selected, a bit map image created from an HTML document is divided simply according to a page size without consideration of separation of objects in a document. This policy can minimize the number of sheets to use because even an object extending across a page boundary between two successive pages is not forwarded to the latter page, but may leave a text unfinished in one page due to a page possibly ending at the middle of the text.

When "output appearance considered" is selected, good output appearance of an object in a document should be maintained as much as possible. When this policy is selected, should a text object extend across a page boundary, beginning with a line in the object, that line and thereafter are forwarded to the latter page. In addition, with this policy, further details as to a manner of handling an object which extends beyond a page end can be specified for every object type.

In the illustrated example, detailed items, namely "divided table not acceptable (table dividing)", "dividable in units of cells (cell dividing)", and "dividable in units of lines within a cell (line dividing)" are listed as options in a space 510 for a table object.

When "divided table not acceptable" is selected, a table extending beyond a page end is forwarded whole to the next page for printing. This policy, which allows the entire table to be printed on the same page, is superior in readability but likely to increase the number of sheets used.

When "dividable in terms of cells" is selected, as for a table, whether or not a table extends beyond a page end in units of cells is determined and, when it does, the first and subsequent cells in the extended part are forwarded to the next page. This policy, which prints a table in two or more pages, can retain some extent of readability as the table is divided in units of cells, while reducing the number of sheets to use as compared to table dividing.

When "dividable in terms of lines within a cell" is selected, as for a table, whether or not a table extends beyond a page end in units of lines is determined and, when it does, the first and subsequent lines in the extended part are forwarded to the next page. This policy, which results in a table divided in the middle of a cell, is inferior in readability but superior in the effect of saving sheets.

Likewise, detailed dividing policies can also be determined for an object such as a list and an image. For a list, similar to a table, detailed policies such as "divided list not acceptable", "dividable in units of items (list items)", "dividable in units of lines within an item", and so forth, can be specified. For an image, a detailed policy as to whether or not a divided image is acceptable when the image extends beyond a page end, can be specified.

It should be noted that, although tables with and without a table frame are not discriminated in the above, different dividing methods may be determined with respect to tables with and without a frame, respectively.

As described above, a major policy "output appearance considered" can be divided into a plurality of different detailed policies, each of which is a combination of detailed items, each determined for every object type. That is, detailed dividing setting for every object type can be designated using the detailed setting screen image 500.

It should be noted that each of the three general dividing policies listed in the general setting screen image 400 of FIG. 4 is correlated with one of a plurality of detailed policies, which can be specified using the detailed setting screen image 500, and information concerning the correlation is registered in the dividing algorithm designating section 305. For example, a general dividing policy "good appearance preferred" of FIG. 4 may be correlated with a detailed policy which is a combination of detailed items "divided table not acceptable", "divided list not acceptable", and "divided image not acceptable", and a general dividing policy "sheet saving preferred" may be correlated with a detailed policy "sheet saving most preferred".

Specifically, when a general dividing policy is selected using the general setting screen image 400, a detailed policy corresponding to the selected general dividing policy is read out with reference to the corresponding information, so that page dividing is performed according to a page dividing algorithm corresponding to the detailed policy read. It should be noted that it is possible to arrange such that a combination of detailed items for each general dividing policy can be customized. A default policy can be customized in a similar manner.

Figure 6:
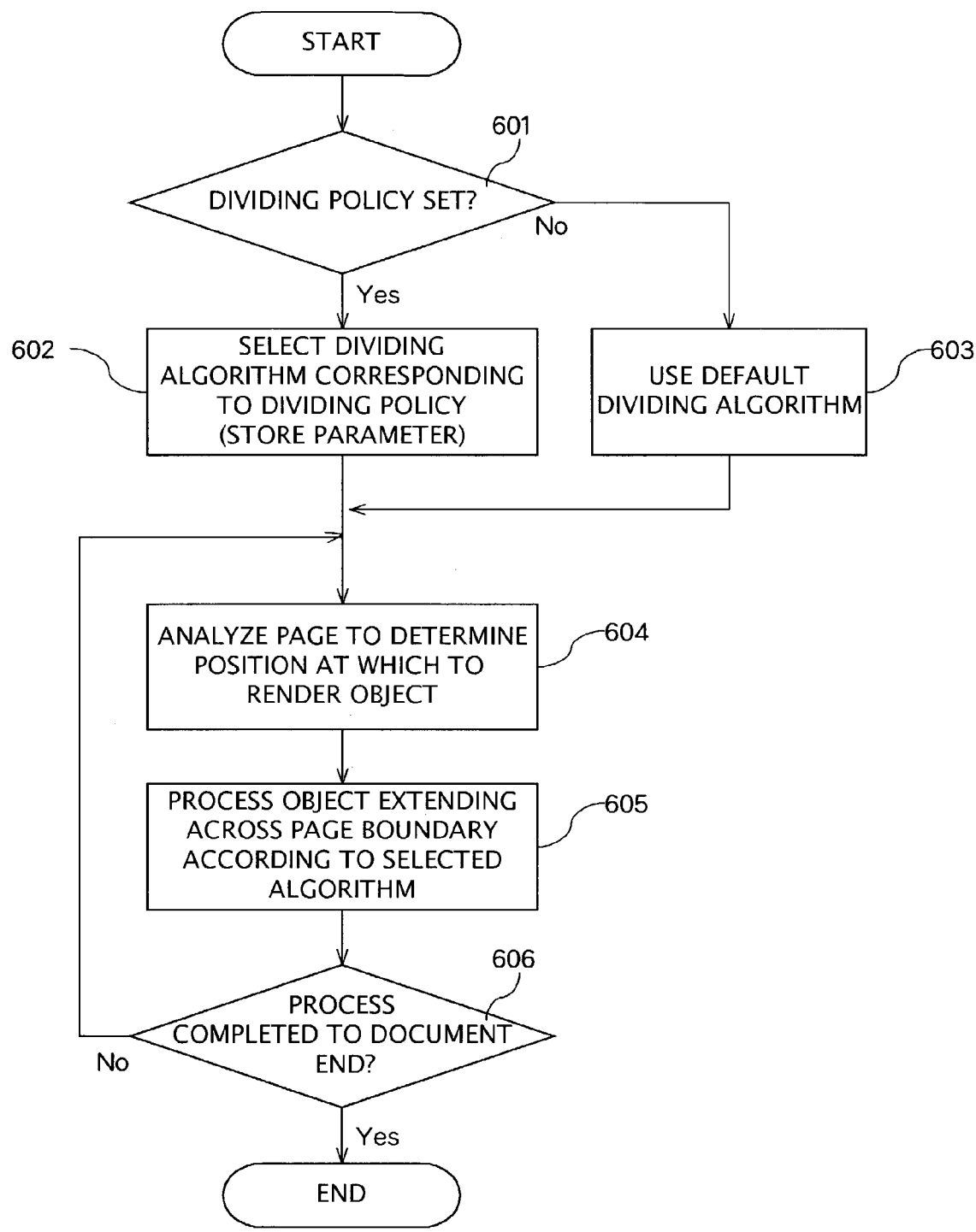
FIG. 6 is a flowchart of an example page dividing procedure in this embodiment.

In the following, a procedure for page dividing by a printer in this embodiment will be described with reference to FIG. 6.

When a print start command is input via the operation panel 104 or from outside of the printer 202, such as the client PC 201 or a mobile device, the dividing algorithm designating section 305 determines whether or not any dividing policy is designated by a user (601). Without designation of a particular dividing policy or with selection of the default button 410 on the general setting screen image 400, the dividing algorithm designating section 305 instructs the page dividing processor 304 to perform page dividing according to a predetermined default dividing algorithm (603).

Figures 7, 8:
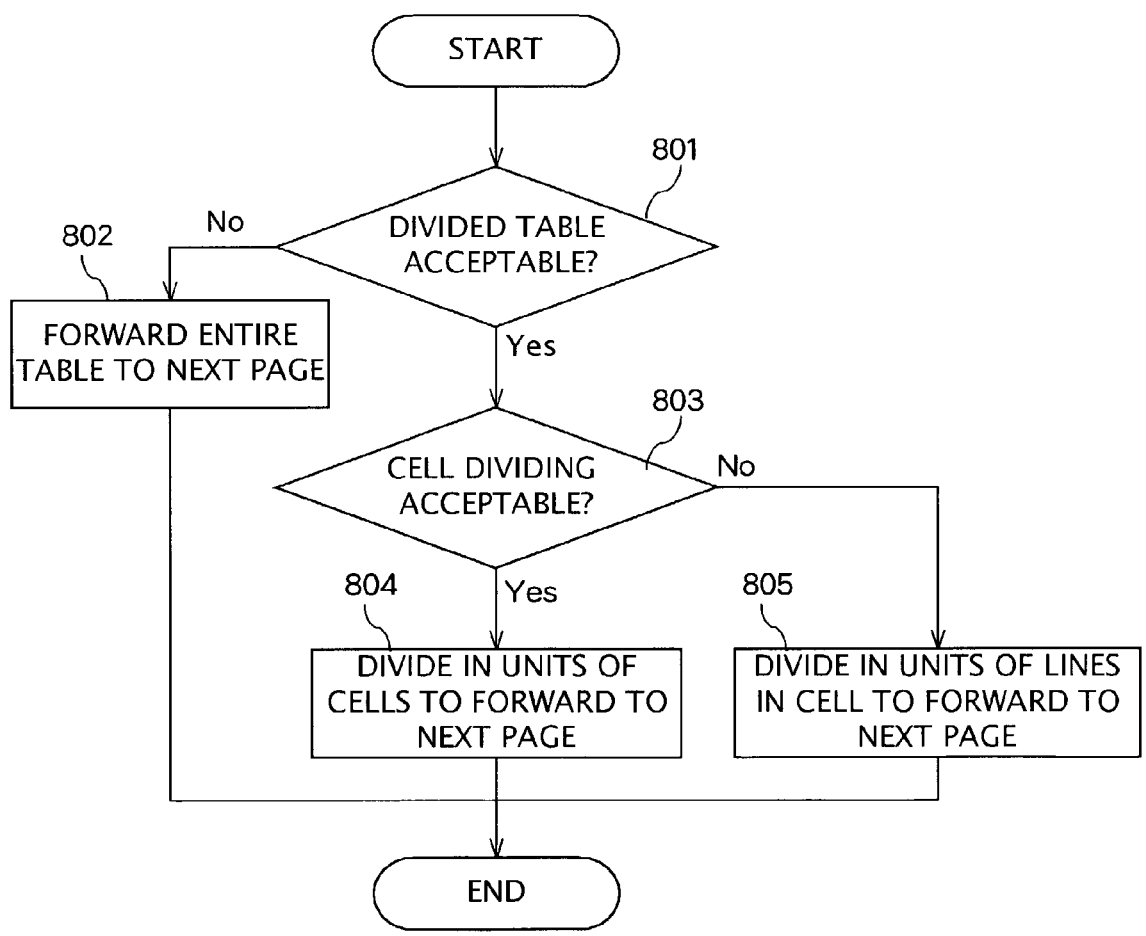
FIG. 7 is a diagram showing an example dividing setting table.
FIG. 8 is a flowchart of example processing applied when a table is placed at a page end.

With any dividing policy designated, on the other hand, the dividing algorithm designating section 305 instructs the page dividing processor 304 to perform page dividing according to a dividing algorithm corresponding to the designated dividing policy (602). At step 602, specifically, content of the detailed dividing setting for every object type, which is predetermined according to the designated dividing policy, is registered in a dividing setting table, as shown in FIG. 7. In this example, a manner of dividing for every object type, namely a table, a list, and an image, is registered.

After designation of a page dividing algorithm, as described above, the page dividing processor 304 determines a position at which each object is to be placed in a page, based on the result of analysis by the document analyzer 303 (604). When any object to be placed across a page end, i.e., a page boundary, is found, a manner of allocating the object to the pages before and after the page boundary is determined according to the designated dividing algorithm (605) before page dividing is performed accordingly from the top of the document.

It should be noted that, for an HTML document with its layout designated according to a Cascading Style Sheets (CSS), or the like, a position of each object is determined according to CSS at step 604. In addition, page breaking should be applied in response to every occurrence of a CSS page breaking mark and, moreover, should any object extend beyond a page end, page dividing should be applied according to the dividing policy designated by a user.

Steps 604, 605 are repeated until the end of an HTML document (606) to complete page dividing with respect to the entire document.

FIG. 8 shows detailed processing at step 605, in particular, processing with respect to a table extending beyond a page end.

Figure 9A:
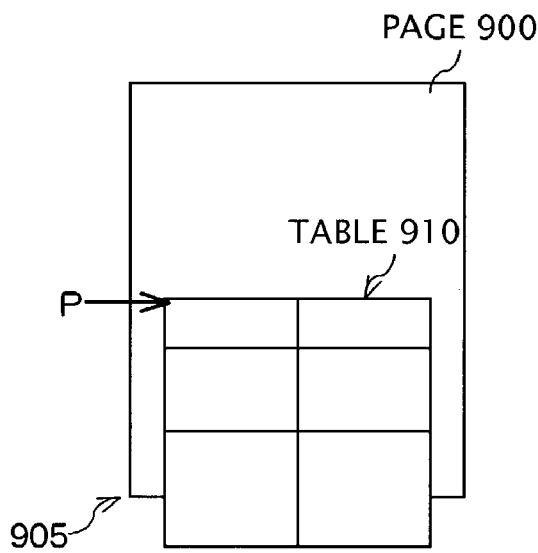
FIGS. 9A, 9B, and 9C are diagrams explaining different results of page dividing according to different dividing policies.

Specifically, the page dividing processor 304 checks the content of the dividing setting table (see FIG. 7) to determine whether or not a divided table is acceptable (801). When it is not (N for step 801), page dividing is performed by forwarding the entire table to the next page (802). In the example of FIG. 9A, as the table 910 extends beyond the end 905 of a page 900, a page dividing position P is set immediately before the table 910, as shown, so that the entire table 910 is forwarded to the next page.

Figure 9B:
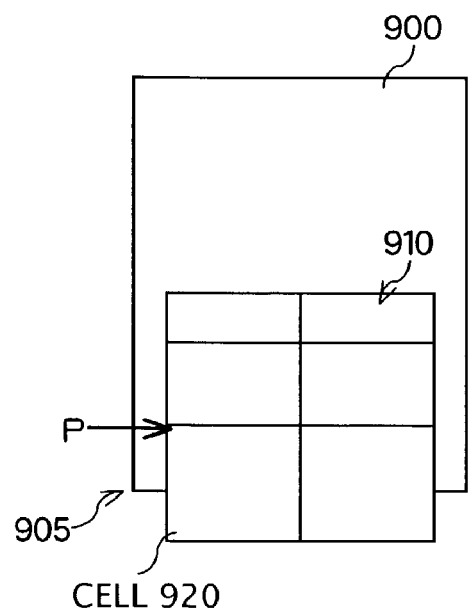

When a divided table is acceptable (Y for step 801), whether or not cell dividing is acceptable is determined (803). When it is (Y for step 803), a cell of the table, placed at the end of a page is found so that page dividing is performed by forwarding that cell and thereafter part of the table to the next page (804). In the example of FIG. 9B, as the third cell 920 from the top of the table 910 extends beyond the end 905 of the page 900, a page dividing point P is set immediately before the cell 920, so that the part of the table from cell 920 and thereafter is forwarded to the next page.

Figure 9C:
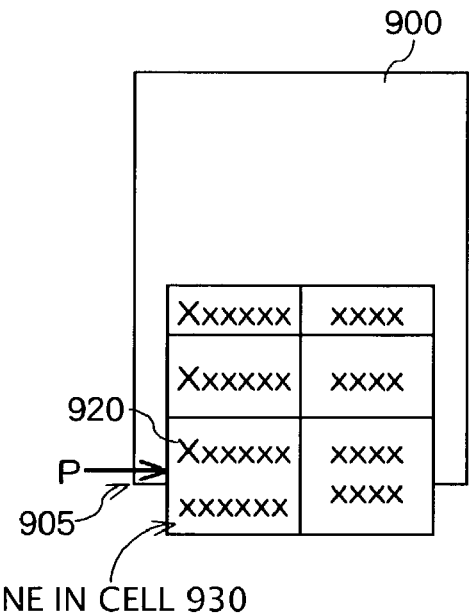

Meanwhile, when cell dividing is not acceptable (N for step 803), line dividing must be acceptable. Therefore, a line in a cell of the table which is placed beyond the page end is found, so that page dividing is performed by forwarding that line and thereafter part of the table to the next page (805). In the example of FIG. 9C, as the second line 930 in the cell 920 is placed beyond the end 905 of the page 900, a page dividing point P is set immediately before the second line 930 in the cell 920, so that the second line 930 and thereafter part of the table are forwarded to the next page.

It should be noted that it is assumed in the above that a table length is shorter than a page length. For a table which is longer in length than a page, the table cannot help but be divided even though a divided table is not acceptable according to the page dividing algorithm designated by the user. In this case, it is preferable that whether cell or line dividing is acceptable can be determined by a user.

As described above, the method in this embodiment, in which a user can select a desirable page dividing algorithm from among a plurality of page dividing algorithms for use in printing, as described above, can satisfy a user's various needs.

It should be noted that, although a default algorithm for use when no particular page dividing policy is explicitly designated by a user is predetermined, for example, by a manager of the printer in the above, a default algorithm may be automatically determined as follows.

For example, the dividing algorithm designating section 305 may learn the history of dividing policies which have been designated by a user so far, and automatically set, as a default algorithm, a dividing algorithm corresponding to a frequently designated dividing policy.

Alternatively, a default page dividing algorithm may be employed depending on print conditions. For example, there are some print conditions, such as N-up (a print mode for collective printing of n number of pages on one sheet) and double-sided (duplex) printing, which can contribute to saving of printing sheets. When such a print condition is designated by a user, a default page dividing algorithm with high sheet saving effect could further enhance the sheet saving effect. Meanwhile, when single-sided printing, for example, is designated, a default page dividing algorithm for better output appearance would be preferred.

This arrangement can be realized using a dividing algorithm designating section 305 which is configured capable of designating a page dividing algorithm corresponding to a print condition. Specifically, when no particular page dividing policy is designated by a user, the dividing algorithm designation section 305 detects a print condition designated by a user with respect to the concerned document and instructs the page dividing processor 304 to apply a default page dividing algorithm corresponding to the print condition. This arrangement makes it possible to employ a default page dividing algorithm according to the property of each print condition.

In addition, a print condition may additionally be considered in determination of a manner of dividing an object which extends beyond a page end for page dividing, though the determination is made based only on the type of the object in the above.

For example, for 2-up printing, in which two pages are printed on the same side of one sheet, it is often the case that page dividing such that a table is printed on two pages on the same side of one sheet may not significantly deteriorate the readability. Therefore, it is possible to arrange, in response to designation of a general dividing policy "good appearance preferred", such that, for example, a table extending beyond the first page of two-page spread is divided in units of cells so that the extended part is printed on the second page of the two-page spread, and that a table extending beyond a second page of two-page spread is forwarded whole to the next page, i.e., the first page of the next two-page spread.

A similar arrangement is possible when stapling or binding double-sided copies. That is, in order for a table to be printed on a two-page spread, a table extending beyond a rear side of a sheet is divided so that the extended part is printed on the front side of the next sheet, and a table extending beyond a front side of a sheet is forwarded whole to the rear side of the same sheet, i.e., the first page of the next two-page spread. This arrangement can be achieved, for example, by individually registering additional correlation information for 2-up printing or other printing to information concerning correlation between a general dividing policy and a detailed policy, so that correlation information corresponding to a print condition selected by a user when printing a document can be utilized.

Although the present invention is applied to a printer in the above, the present invention can also be applied to a print server, a printer driver installed in a personal computer, and so forth.

Further, although an HTML document is referred to as an example in the above, the present invention can obviously be used with respect to a general document, such as an XML or an XHTML-print, which is written in a description language without the concept of pages.

It should be noted that the above embodiment is described only for the purpose of showing an example and that various modifications can be applied to the present invention without departing from the scope of the present invention.

What is claimed is:

1. An image forming device, comprising:
a user interface unit that displays (i) a first display information requiring a user to designate whether or not a first element type is allowed to be divided between a plurality of pages when the first element type is placed across a page boundary of the plurality of pages, the first element type being included in a continuous document formed using a markup language, and (ii) a second display information requiring a user to designate whether or not a second element type is allowed to be divided between a plurality of pages when the second element type is placed across a page boundary of the plurality of pages, the second element type being included in the continuous document and different kind of element type from the first element type; and
a controller that controls a page dividing process to divide the continuous document into a plurality of pages according to the designation of the first and second display information by a user.

2. The image forming device according to claim 1, wherein the controller controls the page dividing process to divide the first element type between a plurality of pages when a user designates that the first element type is allowed to be divided between a plurality of pages.

3. The image forming device according to claim 2, wherein the controller controls the page dividing process not to divide the first element type between a plurality of pages when a user designates, by operating the user interface unit, that the first element type is not allowed to be divided between a plurality of pages.

4. The image forming device according to claim 3, wherein the controller controls the page dividing process to forward the first element type to a latter page, of the plurality of pages, when a user designates, by operating the user interface unit, that the first element type is not allowed to be divided between a plurality of pages.

5. The image forming device according to claim 1, wherein the controller controls the page dividing process to divide the first element type between the plurality of pages when the first element type is allowed to be divided between a plurality of pages by a user, and controls the page dividing process not to divide the second element type between a plurality of pages when a user designates, by operating the user interface unit, that the second element type is not allowed to be divided between a plurality of pages.

6. The image forming device according to claim 1, wherein one of the first and second element types is an image object and the other of the first and second element types is a table object.

7. The image forming device according to claim 1, wherein the first display information includes a plurality of manners of dividing the first element type, and requires designation of one of the manners.

8. The image forming device according to claim 7, wherein the first element type is a table object, and the plurality of manners includes a first manner that divides the table object in units of cells.

9. An image forming method, comprising:
displaying (i) a first display information requiring a user to designate whether or not a first element type is allowed to be divided between a plurality of pages when the first element type is placed across a page boundary of the plurality of pages, the first element type being included in a continuous document formed using a markup language, and (ii) a second display information requiring a user to designate whether or not a second element type is allowed to be divided between a plurality of pages when the second element type is placed across a page boundary of the plurality of pages, the second element type being included in the continuous document and different kind of element type from the first element type; and
controlling a page dividing process to divide the continuous document into a plurality of pages according to the designation of the first and second display information by a user.

10. The image forming method according to claim 9, wherein controlling the page dividing process to divide the first element type between the plurality of pages when the first element type is allowed to be divided between a plurality of pages by a user, and controlling the page dividing process not to divide the second element type between a plurality of pages when a user designates that the second element type is not allowed to be divided between a plurality of pages.

11. The image forming method according to claim 9, wherein one of the first and second element types is an image object and the other of the first and second element types is a table object.

12. The image forming method according to claim 9, wherein the first display information includes a plurality of manners of dividing the first element type, and requires designation of one of the manners.

13. The image forming method according to claim 12, wherein the first element type is a table object, and the plurality of manners includes a first manner that divides the table object in units of cells.

14. A computer storage device storing a program causing a computer to execute a process for image forming, the process comprising:
displaying (i) a first display information requiring a user to designate whether or not a first element type is allowed to be divided between a plurality of pages when the first element type is placed across a page boundary of the plurality of pages, the first element type being included in a continuous document formed using a markup language, and (ii) a second display information requiring a user to designate whether or not a second element type is allowed to be divided between a plurality of pages when the second element type is placed across a page boundary of the plurality of pages, the second element type being included in the continuous document and different kind of element type from the first element type; and controlling a page dividing process to divide the continuous document into a plurality of pages according to the designation of the first and second display information by a user.

15. The computer storage device according to claim 14, wherein controlling the page dividing process to divide the first element type between the plurality of pages when the first element type is allowed to be divided between a plurality of pages by the user, and controlling the page dividing process not to divide the second element type between a plurality of pages when a user designates that the second element type is not allowed to be divided between a plurality of pages.

16. The computer storage device according to claim 14, wherein one of the first and second element types is an image object and the other of the first and second element types is a table object.

17. The computer storage device according to claim 14, wherein the first display information includes a plurality of manners of dividing the first element type, and requires designation of one of the manners.

18. The computer storage device according to claim 17, wherein the first element type is a table object, and the plurality of manners includes a first manner that divides the table object in units of cells.

* * * * *